April 20, 1943. W. W. ROWE 2,316,891
IMPERVIOUS FABRIC AND SEAM THEREIN
Filed Oct. 10, 1941
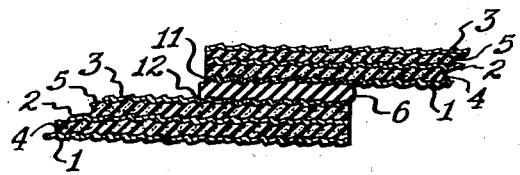
FIG. 1.
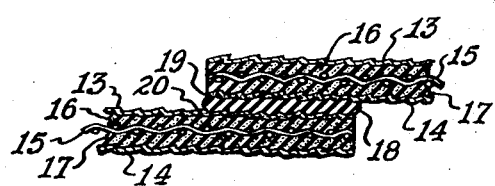
FIG. 2.
FIG. 3.
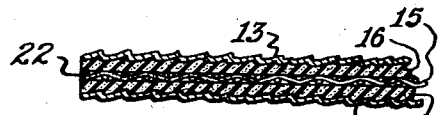
FIG. 4.
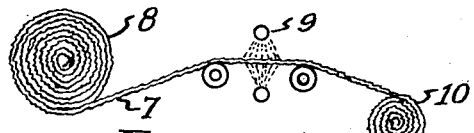
FIG. 5.
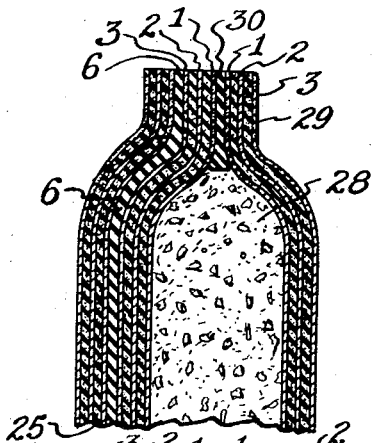
FIG. 6.
PAPER
PAPER (TREATED)
ADHESIVE (ASPHALT)
ADHESIVE (LATEX)
FIG. 8.
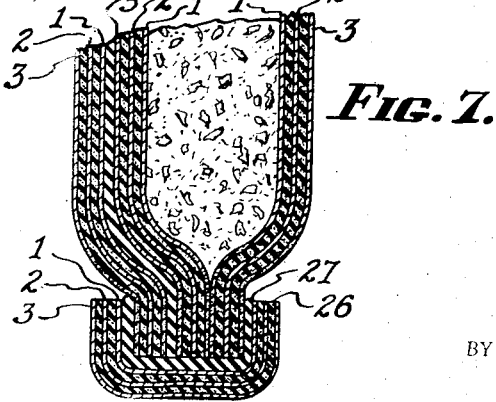
FIG. 7.
INVENTOR.
WILLIAM WALLACE ROWE.
BY Allen & Allen
ATTORNEYS.

Patented Apr. 20, 1943

2,316,891

UNITED STATES PATENT OFFICE 2,316,891

IMPERVIOUS FABRIC AND SEAM THEREIN

William Wallace Rowe, Cincinnati, Ohio, assignor to Cincinnati Industries, Inc., Lockland, Ohio, a corporation of Ohio Application October 10, 1941, Serial No. 414,522

9 Claims. (Cl. 154—42)

This is a continuation in part of my application Serial No. 135,296, filed April 6, 1937.

My invention relates in general to methods of making seams in impervious fabrics, and methods of preventing edgewise penetration of moisture, water or other deleterious agents into the cut edges of fabrics, together with the structures which are the results of these methods. This amounts to a broad statement of the general objects of my invention, and these objects and the more specific ones which will be set forth hereinafter or will be appreciated by the skilled worker in the art on reading these specifications or will be readily apparent hereinafter upon a statement of the problems involved and my solutions thereof, constitute the invention herein claimed.

My invention, as will be apparent, is of relatively broad application. I have chosen for illustrative purposes two exemplary fabrics, the first a fabric made up of a plurality of plies of creped paper cemented together, the second a fabric in which a woven cloth such as burlap, or crossed strands or threads or fibers, forming a reinforcing element, is joined to or interleaved between a layer or layers of creped paper or the like. It will be understood not only that my invention is applicable to modifications of these illustrative fabrics but also that it is equally applicable to other fabrics as will be apparent hereinafter. By way of example, but without limitation, I may employ a composite material comprising paper, an asphaltic adhesive and a film of cellulose nitrate or acetate, or other cellulosic composition or any of those synthetic films which have comparatively recently appeared on the market and which are made of materials derived from rubber, such for example, as "Pliofilm." The composite material may comprise a film of the class indicated, sandwiched between two layers of paper or combinations of paper, film and cloth.

In the drawing to which I now refer, for an illustration of the problems and their solutions:

Figure 1 illustrates a lapped seam formed in a fabric of the type first hereinabove mentioned.

Figure 2 illustrates a lapped seam in a fabric of the type mentioned second above.

Figure 3 is a fragmentary sectional view of a piece of fabric of the first mentioned type in which the center ply has been treated by methods hereinafter to be set forth to give it additional imperviousness.

Figure 4 is a fragmentary sectional view of a fabric of the second class which has not only been given a treatment to make the edge of one paper layer more impervious, but has also been given a treatment to render the whole area of the opposite paper layer more impervious, and a treatment to render the edge of the woven reinforcement impervious and/or water repellent.

Figure 5 is a diagrammatic view showing a procedure which we have found advantageous for the treatment of selected portions of a web.

Figure 6 illustrates treatments which may be applied to the edges of rolls of the materials.

Figure 7 is a sectional view through an exemplary type of small container in which my invention has been incorporated.

Figure 8 shows a series of legends to be used in interpreting Figures 1 to 4 and 7 of the drawing.

There are present on the market today a number of relatively impervious fabrics comprising creped paper or other creped webs in adhesive union with similar webs or other materials. The creped layers may be either webs which have been creped by means of the positive adhesive action of a thermoplastic adhesive as set forth in my Reissue Patent No. 17,633 or creped papers or the like which have been coated with a thermoplastic adhesive substance, such as bitumen, after they have been creped in some other way. The creped layers are not themselves impervious usually, but relatively impervious fabrics can be made of them by reason of the substantially continuous layer or layers of impervious cementing substance which are present in the composite fabrics when creped layers such as I have mentioned are joined to other layers. Various treatments have been proposed for rendering such fabrics more impervious. Also attempts have been made to impregnate the creped webs with various substances either prior to or after the creping step. For this purpose a relatively light flux oil or the like, has been used; but for many purposes this is disadvantageous because of its low melting point, its interference with the use of other adhesives, its unsightly appearance, and its tendency to stain. To a considerable degree these disadvantages are also inherent in the use of waxed papers and the like. As has been indicated, the fabrics themselves can be made satisfactorily impervious even though they comprise pervious layers; but difficulty is then met in the making of impervious seam constructions due to an action which I have termed a "wicking action."

This can be illustrated by considering the exemplary structure shown in Fig. 1. Here I have indicated a composite fabric formed of individual webs 1, 2 and 3, of creped paper joined together by intermediate layers of a suitable adhesive such as asphalt, indicated at 4 and 5. For example, the paper webs may have been creped in accordance with the teachings of Kemp Patent No. 2,071,347, so as to be universally stretchable, and this particular composite fabric is shown and described in my copending application, Serial No. 668,106 filed April 26, 1933, now matured into Patent No. 2,069,778 dated February 9, 1937. The fabric itself is quite impervious by reason of the intervening layers of proofing adhesive 4 and 5. When, as in making a bag, cut edges of this fabric are lapped and joined however, as by a layer of cement 6, (preferably though not necessarily a rubber latex), the seam itself will not be impervious because the adjacent lapped layers of the inner and outer paper webs are not themselves impervious. Thus water or moisture can travel through the body of the ply marked 1, in the upper layer of the lapped fabric where it overlaps the ply marked 3, by a wicking action, and similarly water or moisture can seep through the ply marked 3, in the lower of the lapped layers, at the seam. The distance through which such seepage needs to go to reach the contents of a container formed with such a seam, is only the distance of the width of the adhesive layer 6. Since the layers 1 and 3 are not themselves impervious, gases can also pass through them to escape from or contaminate the material in the container. Moisture or water can thus not only penetrate the container at the seam, but by softening the substance of the layers 1 and 3, at the seam, can weaken them and facilitate seam separation and failure.

These difficulties can all be overcome if over the area of the adhesive 6, the substance of the layers 1 and 3 can be rendered impervious. Clearly the means employed to this end should be such as not to interfere with the action of the adhesive 6, and should not be such as to give trouble due to normal changes in temperature. The method used should preferably not involve the use of heat; it should not be such as to destroy the bond previously formed between different layers of the composite fabric. If the proofing agent is an inherently weak substance, so that an external layer of it would tend to weaken the bond at the seam or if the proofing substance is one which would tend for any other reason to prevent the formation of a good bond at the seam, it will be clearly necessary to secure, if such proofing agent be used, a condition of impregnation of the web without coating thereof or a condition of impregnation such that the body becomes substantially impervious while the surface retains the property of making a good bond with the seaming adhesive.

I have found that these conditions can be met most simply by treating the desired areas of the webs with a solvent for the substance of the layers 4 and 5. The solvent acts to leach out a portion of the layers 4 and 5 and distribute the substance thereof through the body of the selected areas of the webs 1 and 3. This action can be made to occur without any impairment of the adhesive union between the webs which make up the composite fabric; and a further advantage of this procedure is that the leaching action can be confined to desired areas, usually the areas of seam formation, so that the general appearance of the article need not be altered by general discoloration of the plies. Layers 4 and 5 must be heavy enough in relation to amount of solvent used, to saturate layers 1 and 3 and leave a surplus of adhesive as layers 4 and 5.

It is desired, of course, that the adhesive 6 make a good bond with the webs, and it is sometimes preferable to avoid any great quantities of proofing substance dissolved in the solvent in order to prevent a tendency for heavy coating of the fibers at or near the outer surfaces of the webs 1 and 3. As a consequence, in most instances the use of solvent alone is to be preferred because, while it acts as I have described, to destroy the wicking action of the plies, it has substantially no tendency to deposit at the outer surfaces of the plies so much of the proofing agent as would interfere with the formation of a good bond with a dissimilar type of adhesive, or so much as would tend to cause undesired adhesion to other substances. In the treatment of webs substantially through their areas, where those webs are to be joined to other webs or plies in making a composite fabric it will be clear that the problem of bond is a very much simplified one since the adhesive need not be as strong as would be necessary in the formation of a seam. Wax dissolved in a solvent, for example, is a substance which may be used for proofing a ply of material as such, whereas for seam formation in many instances another type of substance is far preferable. It is, of course, a characteristic of my invention that the proofing of any ply may be confined and regulated as to area, and thus different proofing substances may be used in different areas of the same ply.

The solvent employed will vary with the type of proofing agent employed. For asphalts or other bitumen used as the plying agent, benzol or any of the other volatile hydrocarbon solvents may be employed, for example petroleum distillates, carbon tetrachloride and the like. As the skilled worker in the art can determine, appropriate solvents will be used for resinous, cellulosic, gelatinous or other types of plying agents, such for example as acetone, alcohols, ethers, etc., and mixtures of solvents, and the solvents, may, of course, carry hardening agents for the proofing agents where such treatments are desired.

I have already indicated that the addition of various materials to the solvent may be employed to provide a non-tacky surface where the leaching of asphalts or the like through the paper, is relied upon to destroy the permeability or capillarity of the ply or plies. Moreover, I find from experience that the addition of certain materials to the solvent tends sometimes to help confine or restrict the evaporation of the solvent in much the same way as the procedures hereinafter set forth. In other words, wax or nitrocellulose or resin tend to form a film which to some extent seems to retard the evaporation of the solvent, thereby facilitating the leaching action.

The solvent furthermore should preferably be of a volatile character, and should have sufficient penetrating power to saturate the webs 1 and 3. It should be something which evaporates away, preferably leaving no undesirable deposit on the surface of the webs which would have to be removed. However, the difficulty with the use of light and volatile solvents is, I have found, that they do not remain in place long enough, if the fabric is freely exposed to evaporating conditions. Thus, while in the practice of my invention, a composite fabric or the edges or selected portions thereof may be dipped into or coated or impregnated with a solvent, it is not usually commercially convenient to maintain the portions beneath the bath of solvent for an adequate period of time, with the result that it frequently happens that the solvent evaporates before the desired leaching or anti-wicking action has occurred.

I have found that this difficulty may be surmounted by saturating the webs or selected portions of them, and immediately covering the saturated portions so as to delay the evaporation of the solvent. In the web materials a convenient way of doing this is by applying solvent to the desired portions of the webs, and then immediately winding the fabric into a roll, so that the treated portions are immediately covered by adjacent convolutions of the fabric. In this way the solvent may be maintained in the webs, usually for several hours, so that the leaching action is allowed to go forward and become complete. Dependent upon type and amount of solvent and amount of substance to be dissolved, it may be desirable to rewind the roll and dry out the solvent before the action goes too far. I have illustrated this procedure in Fig. 5, where I have shown a composite fabric 7 being unwound from a roll 8, and treated as at 9, with a solvent, by spraying, roller coating, brushing or otherwise. The treatment may be applied to one or both sides. When applied to only one side, it is possible to obtain a leaching effect on both sides through proper relationship of quantity of solvent, duration of confinement etc. This is because the solvent offsets onto the opposite side of the web in the roll. Immediately after the application of the solvent, the fabric is wound into the roll 10 and stored for a short period of time for the completion of the leaching action. In this way very excellent results can be obtained with a minimum of solvent, and therefore a minimum of expense. The result of this treatment is illustrated in Fig. 1, where the webs 1 and 3 are shown as proofed over areas in the seam marked 11 and 12.

In Fig. 2, I have shown a composite fabric comprising paper layers 13 and 14 between which is sandwiched a cloth layer 15, the whole being held together by adhesive layers 16 and 17. 18 indicates the adhesive used in the seam formation, and the proofed areas of the paper layers 13 and 14 are indicated at 19 and 20.

The seam constructions illustrated in Figs. 1 and 2 are only exemplary of those which may be employed, but are sufficiently illustrative for the purposes of this specification. It will be understood that the various types of lapped, bound, and cover strip seams present the same problems and are susceptible to the same solutions. By way of explanation, in addition to the lapped type of seam which I have illustrated in Figs. 1 and 2 and which may be considered, say, a seam used in the formation of bag tubes, there are other types of seams which may be employed in such tubes. Thus the lateral edges of the bag blank may be butted together and a separate strip of material may be adhesively secured to both butted edges, lapping over the line of juncture. An additional strip could likewise be used in the formation of the same on the opposite side of the butted edges. Again in the formation of certain types of seams of composite fabrics, it is desirable to join together plies of the same character, such as fabric to fabric or paper to paper, as distinguished from fabric to paper. Various expedients have been proposed for accomplishing this such as providing at the edges of a bag blank non-coterminous areas of the plies which make up the fabric. To all of these my invention is applicable. In closing the ends of a bag tube, bound seams may be employed; i. e. the edges of the bag blank are brought together and a binding strip lapped about the juxtaposed edges and cemented to the body fabric on each side of the mouth or bottom of a bag. I have not believed it necessary to illustrate the various types of seam formation to which my invention is applicable because these various types of seams do not constitute limitations upon my invention as hereinafter claimed.

Also it will be clear to the worker in the art, in the light of my teachings that it is possible, though not usually advantageous, to form the seam first and afterward proof the layers involved, by the application of solvent or a solution of proofing material, because the solvent will travel into the pervious layers in the seam by the same wicking action that causes trouble with water or moisture in untreated seams. Further, while I have spoken of winding the material into a roll after the application of the solvent, it will be clear that in handling material in sheet form, the individual sheets can be stacked after treatment, and a similar effect obtained. Also in every instance where an undesirable staining of the surface of another sheet or convolution is found to be occurring due to the leaching action, it will be competent to wind into the roll or to interleave between the sheets in a stack, another ply of material to prevent staining or off-setting.

My invention is, of course, not limited to the treatment of selected areas only of the webs, but is applicable to the treatment of the entire area of the web or webs. Where a staining adhesive is employed, this will result of course in a discoloration of the entire surface of an outer web or webs; but in many uses this is not objectionable, and in some uses, the imperviousness of the webs is of more importance than their appearance. However, it is possible to treat the whole area of a web or webs located interiorly of the composite fabric to gain imperviousness without loss of appearance. I have illustrated this in my Fig. 3, which shows a fabric similar to that in Fig. 1, and in which the corresponding parts have been given the same index numerals. It will be noted in this figure however, that the whole area of the interior ply 2 has been proofed as at 21. In the manufacture of this product I make first a duplex sheet consisting say of the webs 1 and 2, cemented together by the layer of adhesive 4. I then treat, with solvent or a solution of proofing agent, the whole surface area of the web 2, and then the web 3 is applied to the proofed web 2 by means of the adhesive layer 5, whereby the solvent is confined and the leaching action takes place.

It will be noted in the structure of Fig. 2 that while wicking action in the paper layers has been destroyed at the seam, the burlap or other reinforcing layer 15 is susceptible to wicking at the edges. This under some circumstances is disadvantageous and an illustration of such circumstances is where a fabric such as that shown in this figure is used as a roofing material, or a siding or building material, or under conditions where it will be exposed to dampness, which might tend to affect the burlap or reinforcing layer. As in Fig. 4, where like numbers indicate like parts, it is advantageous to proof the burlap or reinforcing layer inwardly from the cut edges of the sheet as shown at 22. It will be clear that this can be accomplished in the manufacture of the product by a method similar to that described in connection with the manufacture of the product of Fig. 3. It is also possible however, to proof the burlap or other reinforcement, as well as the paper layer or layers, inwardly from the edges by treating the edges with solvent after the composite fabric has been wound into a roll or stacked in sheets. This is illustrated in Fig. 6, where I have shown a roll 23 of a fabric such as that illustrated in Fig. 2, being treated as at 24 with the solvent.

A preferable method is also illustrated in Fig. 6 and comprises placing the roll 23 in a shallow pan in which some of the desired solvent is placed. I have found that a roll treated in this manner absorbs the volatile solvent with extraordinary rapidity, so much so that if the bottom of a pan is covered with the solvent and if a roll is dipped in this solvent, unless the roll is placed carefully on a level plane as it is dipped, there is a tendency for the solvent to be absorbed into one side of the roll before the remainder of the roll contacts the solvent. However, the method has an advantage over the paint brush method in that if the roll is properly dipped so as to secure even penetration, the depth to which the material is rendered impervious can be controlled quite accurately by regulating the amount of material in the pan, i. e. the depth of the solvent. The two methods shown in Fig. 6 are not necessarily alternative, since in the way indicated, both ends of a roll can be treated at the same time where this is found desirable.

It will be understood that my invention as herein described, is applicable to all sorts of structures made out of the fabrics to which I have referred, and including, but without limitations, bags, containers, liners for containers, covers, waterproof sheets or tarpaulins, etc. It is also applicable to various types of fabrics as I have hereinabove set forth. It is applicable to fabrics containing films, as plies, and to fabrics in which the method I have set forth has been employed to render one of the plies impervious. Thus, by way of example, the center ply only of a triplex material may be teated over its entire surface area to render it impervious by the methods herein set forth, and after the completion of the composite fabric then the seam areas only of the outside plies may be treated.

I have shown in Fig. 7, as exemplary of a small container the requirements of which are strict in the matter of proofness, a powder tube or explosive assembly, which is a small tube-like article which may be made of any of the fabrics I have mentioned, but is preferably made of a fabric of the first class. Such a powder tube may be provided with a longitudinal, lapped center seam indicated at 25, the various parts being shown in section, and indicia corresponding to the indicia in Fig. 1 being applied to the corresponding parts. The container or tube may be closed as shown at the bottom by means of a lapped seam in which a closure strip indicated generally at 26 is applied by means of adhesive 27 (such as rubber latex), about the flattened mouth of the tube, the contiguous layers in the seam, marked respectively 1 and 3, being treated as indicated to prevent a wicking action. In the formation of a bound bottom seam the antiwicking or proofing treatment may be applied on both of the inside walls of the bag where they are brought together, or on both of the outside walls of the bag and on the inside walls of the cover strip. Either or both of these treatments in the bound seam may be desirable.

The tube may be filled with powder 28 or other explosive material. At the top I have shown a different type of closure formed by proofing in accordance with my invention, the contiguous areas of the ply 1 as shown at 29, and cementing these together by a layer of adhesive 30. In forming a powder tube, it will be the practice to pucker or fan both the flat sealed ends of the tube and to tie or bind the puckered portions so as to form a tube-like container which is adapted to be inserted in a drill hole, the ends of the tube not being larger in any transverse dimension than the general diameter of the package. The powder tube is a convenient and relatively small scale illustration of an application of my invention where the requirements are quite strict, inasmuch as structures of this type are normally tested under considerable heads of water and must be impervious to water and moisture, not only in the body of the article but in the seams and closures as well.

In practicing my invention it is not necessary, of course, that the proofed area of contiguous plies be coterminous with the area of adhesive application used in forming a seam or closure since it may be sufficient to proof an area of the fabric adjacent an adhesively treated area providing the areas overlap.

Modifications may be made in my invention without departing from the spirit thereof.

Having thus described my invention, what I claim as new and desire to secure by Letters Patent, is:

1. A process of preparing composite fabrics comprising a pervious, felted surface web joined by a layer of waterproofing substance to another web, for the formation of seams in said composite fabric, the said process comprising applying a solvent for said waterproofing substance to said pervious felted surface web so as to cause the said solvent to penetrate the said web throughout its thickness and over the area of proposed seam formation therein, whereby the said solvent enters said web by capillarity over the said area and dissolves a portion of said waterproofing substance, carrying said substance by diffusion through the thickness of said web in said area from the coated side of said web toward the free side, limiting the quantity of said solvent so as to preserve the bond of said surface web with another web in said composite fabric, and thereafter permitting said solvent to evaporate, leaving the solute so dispersed throughout the permeated web as to destroy normal capillary action in said web.

2. The process claimed in claim 1, including retarding rapid evaporation of said solvent by suitable covering.

3. The process claimed in claim 1 wherein the solvent is applied to selected areas of the free surface of said external permeable web, the fabric being in strip form, and including the step of immediately covering the area so treated by winding the fabric into a roll after the application of solvent thereto.

4. The process claimed in claim 1, including the step of disposing the said fabric in superposed plies, and in which the solvent is applied in controlled quantity to the edges of the superposed plies so that the solvent strikes into each external pervious felted web and permeates the same from the edge thereof.

5. A process of seaming and treating composite fabrics having an external, pervious, felted web joined to another web by a layer of waterproofing substance, which comprises applying to said external web a volatile solvent for said waterproofing substance in such manner as to cause said volatile substance to diffuse throughout the thickness of the said web in selected areas thereof intended to be areas of seam formation, whereby to cause said waterproofing substance to be partially dissolved in said solvent and to diffuse throughout the thickness of the said area of said web, thereafter causing said solvent to evaporate, leaving the solute so dispersed throughout the permeated web as to destroy normal capillary action in said web, applying adhesive to the surface of the area so treated and joining said area to another area by said adhesive for seam formation.

6. The process of claim 5 in which the area permeated by said solvent is covered to prevent rapid evaporation of said solvent during its action on said waterproofing substance and in which said area is thereafter uncovered prior to seam formation.

7. A composite fabric comprising an external felted web normally permeable by capillary action adhered to another web by a layer of waterproofing substance, and including a dispersion of said substance through the permeable web over restricted areas from the edge thereof derived from said substance by capillary distribution of a portion of the substance in a solvent which when evaporated destroys the normal capillarity of the felted web.

8. A seam construction embodying a fabric in which an external, permeable felted web is adhered to another web by means of a layer of waterproofing substance, in which seam construction a portion of said fabric is joined to another layer in said seam by adhesive applied between the external, permeable felted web of said fabric and said layer, and in which the area of said external, permeable felted web which is embraced in said seam is in a condition of substantial water and vapor proofness due to the diffusion throughout its thickness and in the area of seam formation of waterproofing substance derived from said layer of waterproofing substance prior to the application of said external adhesive.

9. A seam construction as claimed in claim 8 wherein the said waterproofing substance is a bitumen and wherein the applied adhesive is one of non-bituminous character.

WILLIAM WALLACE ROWE.